United States Patent [19]

Masaki

[11] 4,306,144

[45] Dec. 15, 1981

[54] WORK MONITORING MEANS FOR GLOW GENERATING WORKING APPARATUS WITH LIGHT SOURCE CONTROL

[75] Inventor: Ichiro Masaki, Kobe, Japan

[73] Assignee: Unimation, Inc., Danbury, Conn.

[21] Appl. No.: 77,320

[22] Filed: Sep. 20, 1979

[30] Foreign Application Priority Data

Sep. 22, 1978 [JP] Japan .................. 53/116843

[51] Int. Cl.³ .................................... G05B 1/00
[52] U.S. Cl. .................................... 250/202; 250/205
[58] Field of Search ............... 250/221, 222, 226, 205, 250/202; 318/577

[56] References Cited

U.S. PATENT DOCUMENTS

| 3,704,372 | 11/1972 | Parker et al. | 250/202 |
| 3,766,355 | 10/1973 | Kottkamp | 250/202 |
| 3,840,739 | 10/1974 | Coulter | 318/577 |

*Primary Examiner*—David C. Nelms
*Attorney, Agent, or Firm*—Fleit & Jacobson

[57] ABSTRACT

An automatic arc welding machine includes a work monitoring device comprising a light source for projecting a light to the workpiece and an image taking device which receives the light as reflected by the workpiece. The light source is so controlled in accordance with the operation of the image taking device that the average intensity of the projected light is increased when the image taking device is in operation. The arrangement is effective to increase the signal-to-noise ratio.

10 Claims, 5 Drawing Figures

WORK MONITORING MEANS FOR GLOW GENERATING WORKING APPARATUS WITH LIGHT SOURCE CONTROL

The present invention relates to work monitoring means for glow generating working apparatus.

The word "glow generating working apparatus" herein used means any apparatus in which glow is generated at working areas when the work is being done. Examples of such apparatus are arc welding machines, plasmic cutting machines and gas cutting machines. In these types of machines, work monitoring means is normally adopted to detect the location on the workpiece where the work is to be done or to inspect the quality of work. For example, in case of an arc welding machine, a slit pattern light is projected to the workpiece to detect the position to be welded by an interruption or distortion of the projected light pattern. The detected position signal is fed to the welding torch control device so that the welding torch is automatically controlled in accordance with the signal.

In order to detect the interruption or distortion of the slit light pattern, use is usually made of an optical image taking device which is in case of an arc welding machine located in advance of the welding torch. In such work monitoring means, however, problems have been encountered in that due to an intense glow of the arc discharge it is very difficult to produce an image of high quality. In order to solve the problem, it has been proposed to provide a shield plate between the welding torch and the image taking device. However, this arrangement is disadvantageous in that the shield plate is very often obstructive to the welding operation. Further, it is necessary to provide the image taking device sufficiently apart from the welding torch so that the image taking device itself may be obstructive where a sufficient space is not available for the welding operation.

It has also been proposed, in order to eliminate or at least decrease the adverse effect of the intense glow of the discharge arc, to provide a band-pass filter in front of the photoelectric surface of the image taking device so that light of only limited wave length range is passed thereto. However, since the glow of the discharge arc or of spattered material has components in the specific wave length range, it is necessary to provide a light source of a substantial capacity in order to obtain an image of a desired SN (signal to noise) ratio which is defined as the ratio of the intensity of light projected from the light source and reflected at the workpiece to the intensity of external light which has an influence on the image quality.

It is therefore an object of the present invention to provide work monitoring means for glow generating apparatus which can produce a high quality image signal without any shielding plate and a high capacity light source.

According to the present invention, the above and other objects can be accomplished by a glow generating working apparatus comprising working means for effecting a work to a workpiece, work monitoring means including light source means for projecting a light to the workpiece, image taking means which is adapted to receive the light from the light source means as reflected at the workpiece and producing an image signal, means for controlling the light source means in accordance with operation of the image taking means so that average intensity of the light becomes greater in a period wherein the image taking means is in operation than in a period wherein the image taking means is not in operation. Typically, the light source means may be de-energized when the image taking means is not in operation. Alternatively, the intensity of the light may be greater in the period wherein the image taking means is in operation than in the period wherein it is not in operation. When the light source means is of such a type that emits pulsating light, the frequency of the light pulses may be controlled.

According to the features of the present invention, the adverse effect of the glow can be eliminated or at least decreased with the light source means of a small capacity.

According to a further feature of the present invention, modulating means is provided in the light source means so that a light of a specific frequency band is projected to the workpiece and the image taking means is of such a type that detects only the light in the frequency band.

The above and other objects and features of the present invention will become apparent from the following descriptions of preferred embodiments taking reference to the accompanying drawings, in which.

Figure 1:
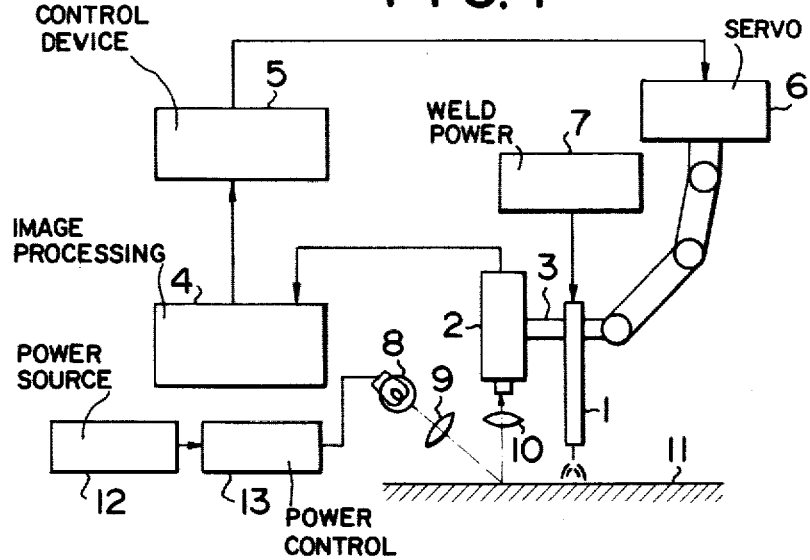
FIG. 1 is a diagrammatical illustration of an arc welding machine embodying the features of the present invention.

Referring to the drawings, particularly to FIG. 1, there is shown an arc welding machine including a welding torch 1 which is carried by a movable member 3 together with an image taking device 2 of a work monitoring system. The image taking device 2 produces an image signal which is transmitted to an image signal processing device 4. The processing device has an output which is connected with a control device 5 which produces a control signal for controlling a servo mechanism 6. The servo mechanism 6 serves to actuate the movable member 3 in accordance with the image signal. The welding torch 1 and the image taking device 2 are placed against a workpiece 11 and a taking lens 10 is disposed in front of the taking device 2. A welding current is supplied to the welding torch 1 from a power source 7.

A light pattern is projected from a light source 8 through a projecting lens 9 to the workpiece 11. The light source 8 is supplied with an electric power from a power source 12 through a power control device 13. The image taking device 2 is provided with an optical filter (not shown) which passes light of only a predetermined frequency band.

Representing the intensity of light on the photoelectric surface on the image taking device 2 by $I_A(\alpha)$, it is noted that the value of $I_A(\alpha)$ varies in accordance with the wave length $\alpha$ of the incident light. Supposing that the optical filter on the image taking device 2 passes light in the wave length band with of $\alpha_{BW}$, the total light intensity I which may have influence on the image taking device is represented by the following equation.

$$I = \int_{\alpha_I}^{\alpha_I + \alpha_{BW}} f(\alpha) \cdot I_A(\alpha) \cdot d\alpha \quad (1)$$

where:

$\alpha_I$ is the minimum wave length in the wave length band; and $f(\alpha)$ is the transmitting coefficient of the optical filter against the light of the wave length $\alpha$.

Thus, it will be understood that the value I depends on the value $\alpha_I$. Therefore, by properly determining the values $\alpha_I$ and $\alpha_{BW}$, it is possible to establish the following relationship.

$$\int_{\alpha_I}^{\alpha_I + \alpha_{BW}} f(\alpha) \cdot I_A(\alpha) \cdot d\alpha < \frac{f_{mean}(\alpha) \cdot \alpha_{BW}}{\alpha_L - \alpha_S} \int_{\alpha_S}^{\alpha_L} I_A(\alpha) \cdot d\alpha \quad (2)$$

where:

$\alpha_L$ is the maximum wave length of an appropriate wave length band such as the whole visual light band;

$\alpha_S$ is the minimum wave length of the appropriate wave length band; and $f_{mean}(\alpha)$ is the mean value of $f(\alpha)$ in the range between $\alpha_I$ and $\alpha_I + \alpha_{BW}$.

Therefore, it is possible to establish the relationship as represented by the following equation (5) even under the relationship of the equation (4) if the light source 8 satisfies the relationship as represented by the equation (3).

$$\int_{\alpha_I}^{\alpha_I + BW} f(\alpha) \cdot I_L(\alpha) \cdot d\alpha > \frac{f_{mean}(\alpha) \cdot \alpha_{BW}}{\alpha_L - \alpha_S} \int_{\alpha_S}^{\alpha_L} I_A(\alpha) \cdot d\alpha \quad (3)$$

where: $I_L$ is the intensity of light on the photoelectric surface on the image taking device due to the light source.

$$\int_{\alpha_S}^{\alpha_L} I_A(\alpha) \cdot d\alpha > \int_{\alpha_S}^{\alpha_L} I_L(\alpha) \cdot d\alpha \quad (4)$$

$$\int_{\alpha_I}^{\alpha_I + BW} f(\alpha) \cdot I_A(\alpha) \cdot d\alpha < \int_{\alpha_I}^{\alpha_I + \alpha_{BW}} f(\alpha) \cdot I_L(\alpha) \cdot d\alpha \quad (5)$$

Under the situation, it will thus be noted that, among the total intensity of light on the photoelectric surface of the image taking device 2, the intensity due to the light from the light source 8 is greater than that due to the glow of the welding arc. It is therefore possible to obtain a high quality image with less influence of the arc glow without increasing the capacity of the light source by determining a threshold value as represented by the equation (6).

$$\int_{\alpha_I}^{\alpha_I + \alpha_{BW}} f(\alpha) \cdot I_A(\alpha) \cdot d\alpha < \quad (6)$$

$$I_{th} < \int_{\alpha_I}^{\alpha_I + \alpha_{BW}} f(\alpha) \cdot I_L(\alpha) \cdot d\alpha$$

Figure 2:
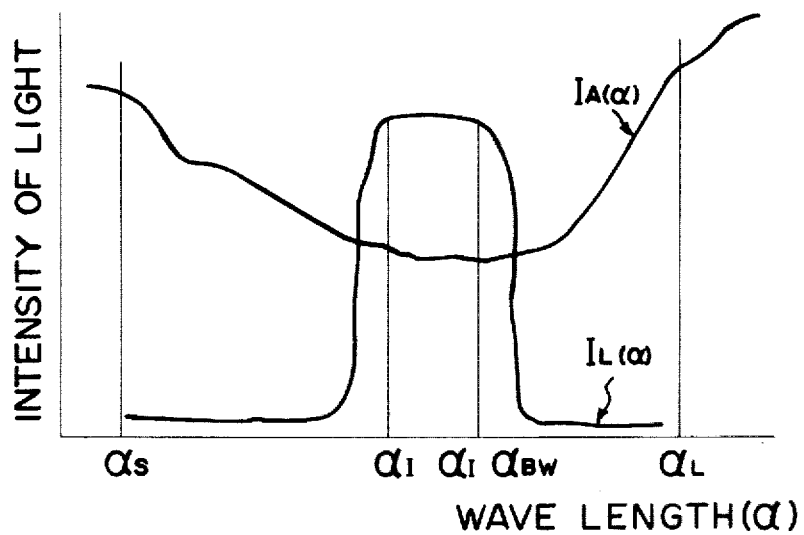
FIG. 2 is a diagram showing external light and monitoring light.

In FIG. 2, there is shown a relationship between $I_A(\alpha)$ and $I_L(\alpha)$. In actual practice, the aforementioned relationship can be established by constituting the light source 8 by a LASER or XENON light source and by adopting an appropriate optical filter in front of the photoelectric surface of the image taking device.

As described above, the signal to noise ratio can be improved to a certain degree by adopting an optical filter to allow to pass therethrough only such light of wave lengths in a limited band. However, in order to obtain a satisfactory signal to noise ratio, the intensity of light from the light source must be of a substantial value. However, since there is a limit for the space available to the light source, it is difficult to adopt a light source of a substantial capacity.

According to the present invention, the above problem can be solved by controlling the light source in accordance with the operation of the image taking device. The capacity Lc of the light source can be represented by the following equation.

$$Lc = \alpha_E \int_{t_0}^{t_0 + t_u} I_{LE}(t) dt \quad (7)$$

where:

$\alpha_E$ is the efficiency;

$t_u$ is a unit time; and $I_{LE}(t)$ is the intensity of light at an instance t.

In view of the fact that the image taking device is not necessarily operated continuously, the value $I_{LE}(t)$ can be changed in accordance with the operation of the image taking device. Through such control of the light source, it is possible to establish the following relationship.

$$\int_{t_1}^{t_1 + t_{BW}} I_{LE}(t) dt > \int_{t_2}^{t_2 + t_{BW}} I_{LE}(t) dt \quad (8)$$

where:

$t_1$ to $t_1 + t_{BW}$ represents the time interval wherein the image taking will be influenced; and $t_2$ to $t_2 + t_{BW}$ represents the time interval wherein the image taking will not be influenced.

It will therefore be understood that the capacity of the light source can be decreased without having any adverse influence on the quality of image.

Figure 3:
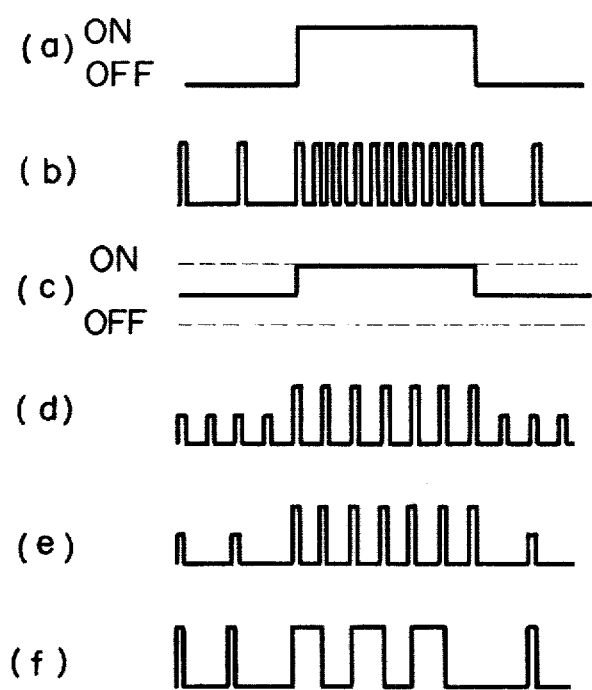
FIG. 3 is a diagram showing various ways of controlling the light source in accordance with the present invention.
Figure 4:
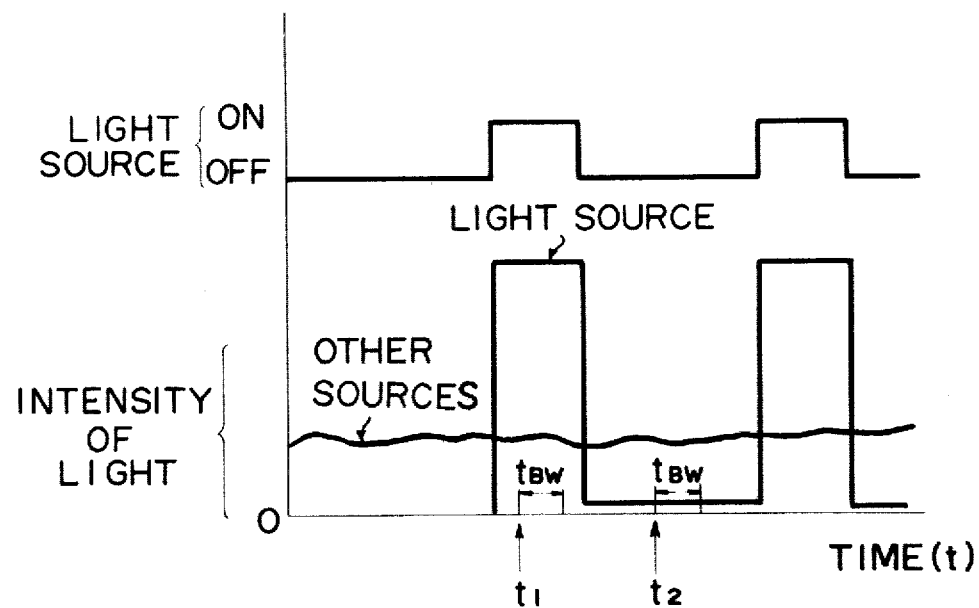
FIG. 4 is a diagram showing in detail the relationship between the operation of the light source and the operation of the image taking device.

Referring to FIG. 3, there are shown several examples of controlling the light source. In FIG. 3(a), the light source is de-energized when the image taking device is not in operation. In the example of FIG. 3(b), the light source is energized by a modulated pulsating power so that a high frequency power is supplied when the image taking device is in operation. In FIGS. 3(c) and (d), the current to the light source is increased when the image taking device is in operation. In FIG. 3(e), the concepts of FIGS. 3(b) and (c) are combined. In FIG. 3(f), the duration of pulse is increased when the image taking device is in operation. In FIG. 4, there is shown the relationship between the operation of the light source and the intensity of light. It will be understood that a necessary intensity of light can be ensured with a relatively small capacity of light source.

Figure 5:
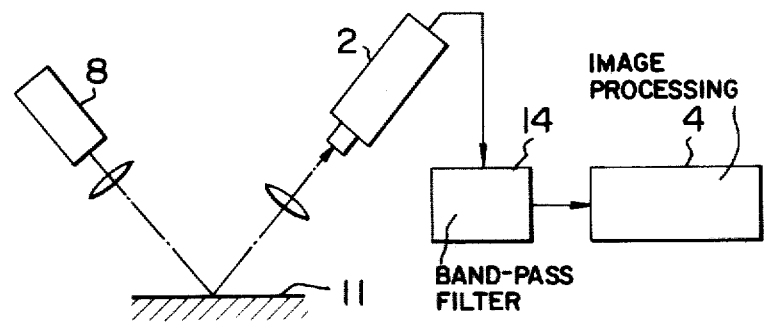
FIG. 5 is a diagrammatical illustration of the monitoring means in accordance with another embodiment of the present invention.

Referring now to FIG. 5, there is shown an embodiment in which the light from the light source 8 is modulated so that a light in a specific wave length band is projected. The light as reflected by the surface of the workpiece 11 is then received by an image taking device 2 which produces an image signal. The image signal is then passed to a band-pass filter 14 wherein the light in the specific wave length is separated from the light of the other sources such as the glow of the discharge arc and the glow of the spatters. For example, the light source 8 may be comprised of a pulse laser source which emits a beam of a specific wave length. The laser beam is received by the image taking device 2 together with the light from other sources and converted into an image signal. However, since the band-pass filter passes only the light of the specific wave length, the processing device 4 can produce a high quality image signal. The modulation of the projected light and the use of the band-pass filter may be adopted in combination with the control of the light source as described with reference to FIG. 3.

It is further advantageous in embodying the present invention to control the operation of the image taking device in accordance with the operation of the welding torch in such a manner that the image taking device is operated when the welding torch is de-energized. There are three factors which are caused by sources other than the light source and have influences on the intensity of light on the photoelectric surface. Those factors are the ones respectively caused by the glow of the arc discharge, by the spatters and by the glow of the molten metal. By controlling the operation of the image taking device in accordance with the operation of the welding torch as described above, it is possible to decrease the intensity of glow caused by the discharge arc during the period wherein the image taking device is in operation. Thus, the wave length of the light from the light source 8 may be so determined that the influences of the spatters and the molten metal can be eliminated by the band-pass filter.

The invention has thus been shown and described with reference to specific embodiments, however, it should be noted that the invention is in no way limited to the details of the illustrated arrangements but changes and modifications may be made without departing from the scope of the appended claims.

I claim:

1. Workpiece monitoring apparatus for a light generating arc welding arrangement arranged to perform arc welding on a workpiece, the workpiece monitoring apparatus comprising:
   means for projecting light onto the workpiece;
   image detection means for developing an image signal and sensing by reflection the light projected onto the workpiece by said projecting means; and
   means for controlling said projecting means in coordination with said image detection means to increase the average intensity of said projected light during operation of said image detection means relative to the average intensity of said projected light when said image detection means is not in operation to develop an image signal.

2. The workpiece monitoring apparatus of claim 1 wherein said controlling means comprises means for selectively de-energizing said projecting means.

3. The workpiece monitoring apparatus of claim 1 wherein said controlling means comprises means for selectively increasing the intensity of said projected light.

4. The workpiece monitoring apparatus of claim 1 wherein said projecting means comprises light source means for emitting a pulsating light output and said controlling means comprises means being selectively responsive to the pulse frequency of said pulsating light output.

5. The workpiece monitoring apparatus of claim 1 wherein said projecting means comprises light source means for emitting light within a specific frequency range, said image detection means comprising filter means being substantially more responsive to light within said specific frequency range relative to light outside said specific frequency range.

6. The workpiece monitoring apparatus of claim 1 wherein said projecting means comprises light source means for emitting a pulsed light output, said controlling means increasing the pulse rate of operation of said projecting means during the operation of said image detection means.

7. The workpiece monitoring apparatus of claim 6 wherein said projecting means comprises light source means for emitting a pulsed light output, said controlling means increasing the pulse width of said pulsed light output during the operation of said image detection means.

8. The workpiece monitoring apparatus of claim 1 wherein said projecting means comprises light source means and modulating means for controlling operation of said light source means such that said projected light is defined by a predetermined frequency band in the time domain, said workpiece monitoring apparatus further comprising band pass filter means responsive to said image signal and being selectively responsive to light within said predetermined frequency band in the time domain.

9. The workpiece monitoring apparatus of claim 8 wherein said specific frequency band in the time domain is defined by a predetermined pulse repetition rate in Hertz, said band pass filter means having a response defined by a range of frequency around said predetermined pulse repetition rate.

10. A method of monitoring a workpiece arranged at a work station in the vicinity of a light generating arc welding arrangement, the method comprising the steps of:
   projecting light onto a workpiece;
   sensing the reflected image from the workpiece at selected times; and
   controlling the average intensity of the projected light to increase the average intensity of the projected light during said workpiece sensing relative to the average intensity during the times when said sensing is not being performed.

* * * * *